(12) United States Patent
Yan et al.

(10) Patent No.: US 11,041,722 B2
(45) Date of Patent: Jun. 22, 2021

(54) SYSTEMS AND METHODS FOR SENSING ANGULAR MOTION IN THE PRESENCE OF LOW-FREQUENCY NOISE

(71) Applicant: Analog Devices, Inc., Norwood, MA (US)

(72) Inventors: Jiefeng Yan, Andover, MA (US); William A. Clark, Winchester, MA (US); Ronald A. Kapusta, Jr., Carlisle, MA (US)

(73) Assignee: Analog Devices, Inc., Wilmington, MA (US)

( * ) Notice: Subject to any disclaimer, the term of this patent is extended or adjusted under 35 U.S.C. 154(b) by 241 days.

(21) Appl. No.: 16/042,742

(22) Filed: Jul. 23, 2018

(65) Prior Publication Data

US 2020/0025566 A1    Jan. 23, 2020

(51) Int. Cl.
*G01C 19/5726* (2012.01)
*G01C 19/5755* (2012.01)

(52) U.S. Cl.
CPC ..... *G01C 19/5726* (2013.01); *G01C 19/5755* (2013.01)

(58) Field of Classification Search
CPC .... G01C 19/5776; G01C 21/16; G01C 19/00; G01C 21/005
See application file for complete search history.

(56) References Cited

U.S. PATENT DOCUMENTS 5,218,867 A    6/1993  Varnham
5,540,094 A    7/1996  Varnham
(Continued)

FOREIGN PATENT DOCUMENTS

CN    102620726    8/2012
CN    107449414 A   12/2017
(Continued)

OTHER PUBLICATIONS

Great Britain Combined Search and Examination Report dated Oct. 12, 2016 in connection with Great Britain Application No. GB1604932.2.

International Search Report and Written Opinion Application dated Jul. 28, 2016 in connection with International Application No. PCT/US2016/026385.

(Continued)

*Primary Examiner* — Alexander Satanovsky
(74) *Attorney, Agent, or Firm* — Wolf, Greenfield & Sacks, P.C.

(57) ABSTRACT

Systems and methods for sensing angular motion using a microelectromechanical system (MEMS) gyroscope are described. These systems and methods may be useful for sensing angular motion in the presence of low-frequency noise, which may be noise below 1 KHz. In a system for sensing angular motion, low-frequency noise may give rise to duty cycle jitter, which may affect the demodulation of the sense signal and cause errors in angular motion estimates. The systems and methods described herein address this problem by relying on double-edge phase detection technique that involves sensing when the rising and falling edges of the resonator signal deviate from their expected values in the idealized 50% duty cycle scenario. To prevent the formation of ripples in the double-edge phase detection that may otherwise affect the demodulation of the sense signal, a switch may be used. The switch may be maintained in a non-conductive state when a ripple is received.

20 Claims, 9 Drawing Sheets

(56) References Cited

U.S. PATENT DOCUMENTS

| | | |
|---|---|---|
| 5,866,816 A | 2/1999 | Hulsing, II |
| 5,889,193 A | 3/1999 | Pfaff et al. |
| 5,969,225 A | 10/1999 | Kobayashi |
| 5,987,984 A | 11/1999 | Artzner |
| 5,992,233 A | 11/1999 | Clark |
| 6,018,996 A | 2/2000 | Matsuhiro et al. |
| 6,198,355 B1 | 3/2001 | Lindquist et al. |
| 6,510,737 B1 | 1/2003 | Hobbs |
| 6,598,455 B1 | 7/2003 | Gutierrez |
| 6,768,358 B2 | 7/2004 | Birk et al. |
| 6,934,665 B2 | 8/2005 | Rober |
| 7,123,111 B2 | 10/2006 | Brunson et al. |
| 7,188,522 B2 | 3/2007 | Betz |
| 7,219,529 B2 | 5/2007 | Fell |
| 7,253,615 B2 | 8/2007 | Berkcan et al. |
| 7,640,803 B1 | 1/2010 | Gutierrez |
| 7,980,133 B2 | 7/2011 | Geen et al. |
| 8,151,641 B2 | 4/2012 | Geen |
| 8,347,718 B2 | 1/2013 | Malvern |
| 8,375,789 B2 | 2/2013 | Prandi et al. |
| 8,401,140 B2 | 3/2013 | Mijuskovic |
| 8,446,222 B2 | 5/2013 | Brenndorfer |
| 8,464,571 B1 | 6/2013 | Sparks et al. |
| 8,497,746 B2 | 7/2013 | Visconti et al. |
| 8,616,055 B2 | 12/2013 | Geen |
| 8,624,679 B2 | 1/2014 | Dikshit et al. |
| 8,661,898 B2 | 3/2014 | Watson |
| 8,689,631 B1 | 4/2014 | Tally et al. |
| 8,701,459 B2 | 4/2014 | Geen |
| 8,884,710 B2 | 11/2014 | Shaeffer et al. |
| 9,103,845 B2 | 8/2015 | Schlarmann et al. |
| 9,176,165 B2 | 11/2015 | Quer et al. |
| 9,278,847 B2 | 3/2016 | Cazzaniga et al. |
| 9,410,806 B2 | 8/2016 | Ezekwe |
| 9,459,100 B2 | 10/2016 | Balachandran et al. |
| 9,506,757 B2 | 11/2016 | Shaeffer et al. |
| 9,634,678 B1 | 4/2017 | Caffee et al. |
| 9,709,400 B2 | 7/2017 | Kapusta |
| 10,309,782 B2 | 6/2019 | Kapusta et al. |
| 2001/0029784 A1 | 10/2001 | Kurachi et al. |
| 2003/0101814 A1 | 6/2003 | Challoner |
| 2005/0183502 A1 | 8/2005 | Rodney |
| 2005/0257596 A1 | 11/2005 | Fell |
| 2006/0142958 A1 | 6/2006 | Morell et al. |
| 2006/0201250 A1 | 9/2006 | Kourepenis |
| 2007/0119258 A1 | 5/2007 | Yee |
| 2007/0163345 A1 | 7/2007 | Nozoe |
| 2007/0256495 A1 | 11/2007 | Watson |
| 2008/0170742 A1 | 7/2008 | Trusov et al. |
| 2008/0204093 A1* | 8/2008 | Lin ...................... H03L 7/0812 327/158 |
| 2009/0083011 A1 | 3/2009 | Hao |
| 2009/0249875 A1 | 10/2009 | Steinlechner |
| 2009/0272189 A1 | 11/2009 | Acar et al. |
| 2009/0282916 A1 | 11/2009 | Modugno |
| 2010/0212424 A1 | 8/2010 | Malvern |
| 2010/0271067 A1 | 10/2010 | Cauli et al. |
| 2011/0167891 A1 | 7/2011 | Geen |
| 2011/0179872 A1 | 7/2011 | Kaino et al. |
| 2012/0006114 A1 | 1/2012 | Caminada et al. |
| 2012/0024057 A1 | 2/2012 | Sasaki et al. |
| 2013/0098153 A1 | 4/2013 | Trusov |
| 2013/0099836 A1* | 4/2013 | Shaeffer ................ H03L 7/0893 327/148 |
| 2013/0283908 A1 | 10/2013 | Geen et al. |
| 2014/0000365 A1 | 1/2014 | Aaltonen et al. |
| 2014/0000366 A1 | 1/2014 | Blomquist |
| 2014/0085017 A1 | 3/2014 | Tsinker |
| 2015/0226557 A1 | 8/2015 | Aaltonen |
| 2015/0247877 A1 | 9/2015 | Kanemoto |
| 2015/0285658 A1 | 10/2015 | Zotov |
| 2015/0341041 A1 | 11/2015 | Balachandran et al. |
| 2016/0298963 A1* | 10/2016 | Kapusta ............. G01C 19/5776 |
| 2016/0298965 A1 | 10/2016 | Kapusta |
| 2016/0334213 A1 | 11/2016 | DeWall |
| 2017/0135600 A1 | 5/2017 | Chien et al. |
| 2017/0214407 A1 | 7/2017 | Kianush et al. |
| 2017/0307374 A1 | 10/2017 | Hughes |
| 2018/0175840 A1* | 6/2018 | Todorokihara ......... H03K 21/10 |

FOREIGN PATENT DOCUMENTS

| | | |
|---|---|---|
| EP | 2 211 458 A1 | 7/2010 |
| EP | 2 657 648 A2 | 10/2013 |
| JP | 2013-521486 | 6/2013 |
| JP | 2016-200579 A | 12/2016 |
| WO | WO 01/79862 A1 | 10/2001 |

OTHER PUBLICATIONS

International Preliminary Report on Patentability dated Oct. 19, 2017 in connection with International Application No. PCT/US2016/026385.

[No Author Listed], ADXC1500, Combined gyroscope and dual-axis accelerometer. Analog Devices Data Sheet. Retrieved from the Internet (last accessed Apr. 20, 2018) http://www.analog.com/en/products/sensors-mems/inertial-measurement-units/adxc1500.html.

[No Author Listed], ADXRS290 Ultralow noise, dual-axis MEMS gyroscope for stabilization applications. Analog Devices Data Sheet. Retrieved from the Internet (last accessed Apr. 20, 2018) http://www.analog.com/en/products/sensors-mems/gyroscopes/adxrs290.html#product-overview.

Aaltonen et al., An analog drive loop for a capacitive MEMS gyroscope. Analog Integr Circ Sig Process. 2010;63:465-76.

Ayazi et al., A HARPSS Polysilicon Vibrating Ring Gyroscope. Journal of Microelectromechanical Systems. Jun. 2001;10(2):169-179.

Ayazi et al., Design and Fabrication of a High-Performance Polysilicon Vibrating Ring Gyroscope. Center for Integrated Sensors and Circuits. Eleventh IEEE/ASME International Workshop on Micro Electro Mechanical Systems. Germany, Jan. 1998;pp. 621-626.

Ayazi et al., High Aspect-Ratio Combined Poly and Single-Crystal Silicon (HARPSS) MEMS Technology. Journal of Microelectromechanical Systems. Sep. 2000;9(3):288-294.

Balachandran et al., A 3-Axis Gyroscope for Electronic Stability Control With Continuous Self-Test. IEEE Journal of Solid-State Circuits. Jan. 2016;51(1):177-186.

Fan et al., An adaptive feedback circuit for MEMS resonators. Journal of Micromechanics and Microengineering. 2011;21:045008.

Geen et al., New iMEMS® Angular-Rate-Sensing Gyroscope. ADI Micromachined Products Division. Analoge Dialogue. 2003; p. 37-3.

Izyumin, Readout Circuits for Frequency-Modulated Gyroscopes. Electrical Engineering and Computer Sciences. University of California at Berkely. Technical Report No. UCB/EECS-2015-214. Dec. 1, 2015; 93 pages.

Kundert, Predicting the Phase Noise and Jitter of PLL-Based Frequency Synthesizers. The Designer's Guide Community Oct. 2015; Version 4i:pp. 1-52.

Leland, Adaptive Mode Tuning for Vibrational Gyroscopes. IEEE Transactions on Control Systems Technology. Mar. 2003;11(2):242-7.

Mathias et al., Architecture for Integrated MEMS Resonators Quality Factor Measurement. DTIP of MEMS & MOEMS Conf. Stresa, Italy. Apr. 25-27 2007; 5 pages.

Nguyen, Micromechanical Resonators for Oscillators and Filters. IEEE Ultrasonics Symposium. Nov. 1995;1:489-99.

Oboe et al., Control of a Z-Axis MEMS Vibrational Gyroscope. IEEE/ASME Transactions on Mechatronics. Aug. 2005;10(4):364-370.

Ozdemir et al., Measuring the Quality Factor in MEMS Devices. Micromachines. 2015;6:1935-45.

Park et al., Laterally Oscillated and Force-Balanced Micro Vibratory Rate Gyroscope Supported by Fish Hook Shape Springs. Proceedings of the IEEE 10th Annual International Workshop on Micro Electro Mechanical Systems. Jan. 1997;pp. 494-499.

(56) References Cited

OTHER PUBLICATIONS

Tang et al., A Packaged Silicon MEMS Vibratory Gyroscope for Microspacecraft. Proceedings of the IEEE 10th Annual International Workshop on Micro Electro Mechanical Systems. Jan. 1997; pp. 500-505.

Zeng et al., An energy-efficient readout circuit for resonant sensors based on ring-down measurement. Review of Scientific Instruments. 2013;84:025005.

Zhang et al., High precision measurement of quality factor for MEMS resonators. Science Direct, Procedia Chemistry. 2009;1:827-830.

\* cited by examiner

SYSTEMS AND METHODS FOR SENSING ANGULAR MOTION IN THE PRESENCE OF LOW-FREQUENCY NOISE

FIELD OF THE DISCLOSURE

The present application relates to microelectromechanical system (MEMS) gyroscopes.

BACKGROUND

Microelectromechanical systems (MEMS) gyroscopes are configured to detect angular motion by sensing accelerations produced by Coriolis forces. Coriolis forces arise when a resonant mass of a MEMS gyroscope is subjected to angular motion.

SUMMARY OF THE DISCLOSURE

Some embodiments relate to systems and methods for sensing angular motion using a microelectromechanical system (MEMS) gyroscope. These systems and methods may be useful for sensing angular motion in the presence of low-frequency noise, which may be noise below 1 KHz. In a system for sensing angular motion, low-frequency noise may give rise to duty cycle jitter, which may affect the demodulation of the sense signal and cause errors in angular motion estimates. Such errors are often referred to as "bias instability." The systems and methods described herein address this problem by relying on double-edge phase detection technique that involves sensing when the rising and falling edges of the resonator signal deviate from their expected values in the idealized 50% duty cycle scenario. To prevent the formation of ripples in the double-edge phase detection that may otherwise affect the demodulation of the sense signal, a switch may be used. The switch may be maintained in a non-conductive state when a ripple is received.

Some embodiments relate to a method for sensing angular motion using a microelectromechanical system (MEMS) gyroscope having a sense path output terminal and a resonator path output terminal. The method may comprise receiving, from the resonator path output terminal, a resonator signal generated in response to resonance of the MEMS gyroscope; receiving, from the sense path output terminal, a first sense signal generated in response to a Coriolis force; generating a control signal at least in part based on: a first signal generated based on a rising edge of the resonator signal and a rising edge of a reference signal, a second signal generated based on a falling edge of the resonator signal and a falling edge of the reference signal, and an enabling signal; controlling a frequency of a demodulating signal using the control signal; and generating a second sense signal using the first sense signal and the demodulating signal.

Some embodiments relate to a system for sensing angular motion, comprising: circuitry configured to: receive, from a resonator path output terminal of a microelectromechanical system (MEMS) gyroscope, a resonator signal generated in response to resonance of the MEMS gyroscope; receive, from a sense path output terminal of the MEMS gyroscope, a first sense signal generated in response to a Coriolis force; generate a control signal at least in part based on: a first signal generated based a rising edge of the resonator signal and a rising edge of a reference signal, a second signal generated based on a falling edge of the resonator signal and a falling edge of the reference signal, and an enabling signal; control a frequency of a demodulating signal using the control signal; and generate a second sense signal using the first sense signal and the demodulating signal.

Some embodiments relate to a system for sensing angular motion, the system comprising: a microelectromechanical system (MEMS) gyroscope having a sense path output terminal and a resonator path output terminal; a mixer having first and second input terminals, the first input terminal being coupled to the sense path output terminal of the MEMS gyroscope; a phase-locked loop (PLL) coupled to the resonator path output terminal of the MEMS gyroscope and to the second terminal of the mixer, the PLL comprising: a dual-edge phase frequency detector (DE-PFD); a charge pump coupled to the DE-PFD; a voltage controlled oscillator (VCO); and a switch coupled between the charge pump and the VCO.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

I. Overview

The inventors have recognized and appreciated that low-frequency noise can adversely impact the accuracy of MEMS gyroscope-based systems for sensing angular motion. Low-frequency noise causes a MEMS gyroscope's accuracy to degrade over time ("drift" as it is sometimes termed), which may lead to sensing error to increase at a rate that, in some instances, is as high as 2.5 degrees per hour.

When the error due to drift accumulates over several hours, the accuracy of the MEMS gyroscope can quickly fall below acceptable values. Consider, for example, a computer-based navigation system that relies on a set of MEMS gyroscopes to track the motion of a vehicle. Even if the information output by the MEMS gyroscopes initially accurately reflects the motion of the vehicle, the accuracy of the underlying MEMS gyroscopes will degrade rapidly over time, rendering their output unusable for navigation purposes.

Conventional approaches to addressing drift in a MEMS gyroscope-based system for sensing angular motion is to periodically reset the system thereby preventing accumulation of error. However, this approach disrupts operation of the system and causes gaps in angular motion data being acquired, which may not be acceptable in some applications.

The inventors have recognized that low-frequency noise degrades the accuracy of angular motion detection because it causes the duty cycle of the signal used for the demodulation of the sense signal to vary over time—this phenomenon is sometimes called duty cycle jitter. When a gyroscope senses angular motion, the output signal has a modulation carrier oscillating at the gyroscope's resonance frequency. To determine angular velocity using the sense signal, the sense signal is demodulated to baseband before being digitized. Signals oscillating at the gyroscope's resonance frequency are used to demodulate the sense signal to baseband. However, if the duty cycle of the demodulating signal varies over time due to low-frequency noise, the signal resulting from the demodulation is distorted such that it may not accurately reflect the angular motion experienced by the gyroscope.

The inventors have appreciated that the impact of low-frequency noise on systems for sensing angular motion using MEMS gyroscopes may be mitigated by reducing duty cycle jitter (e.g., by reducing the number of instances in which the duty cycle deviates from the expected value and/or by reducing the extent to which the duty cycle deviates from the expected value). In some embodiments, duty cycle jitter may be limited by forcing the duty cycle of the demodulating signal to be approximately 50% (or a different target value). This may be achieved, in some embodiments, by controlling, based on a control signal, the frequency output by a phase locked loop (PLL). The control signal may be generated based on: 1) a first signal generated based on a rising edge of the resonator signal and a rising edge of a reference signal, and 2) a second signal generated based on a falling edge of the resonator signal and a falling edge of the reference signal. Generating the control signal based on 1) and 2) may set the duty cycle of the demodulating signal to be approximately 50% (or to any other suitable percentage threshold set a priori) while maintaining the frequency of the demodulating signal at the resonant frequency of the gyroscope.

Although the above-described approach of mitigating the impact of low-frequency noise by reducing duty cycle jitter can be effective, in some instances, the control signal may result in the demodulating signal experiencing undesirable frequency fluctuations. Such fluctuations may originate due to the presence of ripples or other undesired features in the amplitude of the control signal when generated based on 1) and 2). Distortions in the detection of angular motion may arise when a demodulating signal exhibiting such frequency fluctuations is mixed with the sense signal.

In some embodiments, such undesired fluctuations in the frequency of the demodulating signal may be reduced or entirely removed by preventing the formation of undesired ripples that may otherwise arise in the control signal. In this way, the PLL may lock to the desired frequency without experiencing undesired fluctuations. In some embodiments, the formation of ripples in the control signal may be prevented by generating the control signal not only based on 1) and 2), but also based on 3) an enabling signal. The enabling signal may be timed and arranged to block the ripples from the PLL. In this way, fluctuations in the frequency of the demodulating signal are limited. The bias instability of systems designed in this manner can be limited to less than 1 degree per hour, in some circumstances.

II. Examples of MEMS Gyroscopes

Figure 1A:
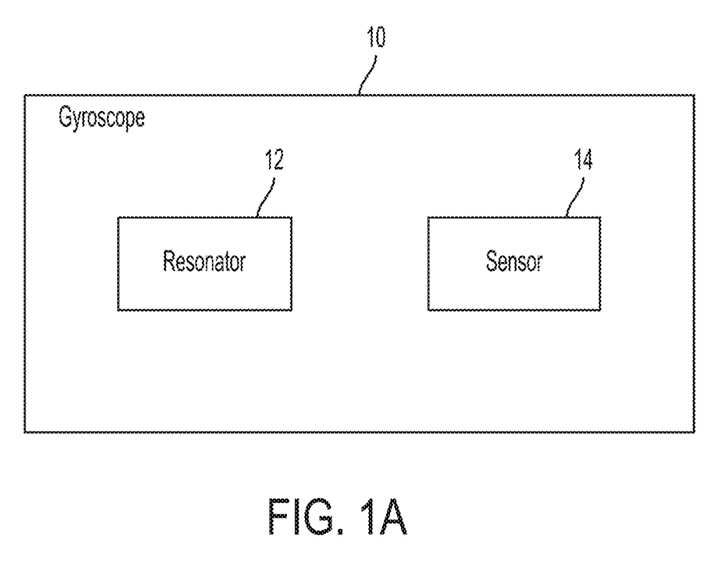
FIG. 1A is a block diagram illustrating a microelectromechanical system (MEMS) gyroscope, in accordance with some embodiments of the technology described herein.

FIG. 1 is a block diagram illustrating a gyroscope 10, according to some embodiments. Gyroscope 10 comprises resonator 12 and sensor 14. Resonator 12 is configured to resonate periodically, when driven by a drive signal. Sensor 14 (which may be an accelerometer in some embodiments) is configured to sense angular velocities. Accordingly, when gyroscope 10 is subjected to angular motion (e.g., when the gyroscope is rotated relative to an axis), the angular rate at which the angular motion occurs (e.g., the rate of rotation) can be sensed using sensor 14.

In some embodiments, gyroscope 10 is configured to sense angular velocities by detecting acceleration arising from the Coriolis effect. The Coriolis effect, and hence a Coriolis force, arises when: 1) resonator 12 resonates; and 2) the gyroscope is subjected to angular motion. In these circumstances, sensor 14 may detect the acceleration resulting from the Coriolis effect. The angular rate associated with the angular motion may be inferred from the acceleration, for example, by using sense circuitry coupled to sensor 14.

Figure 1B:
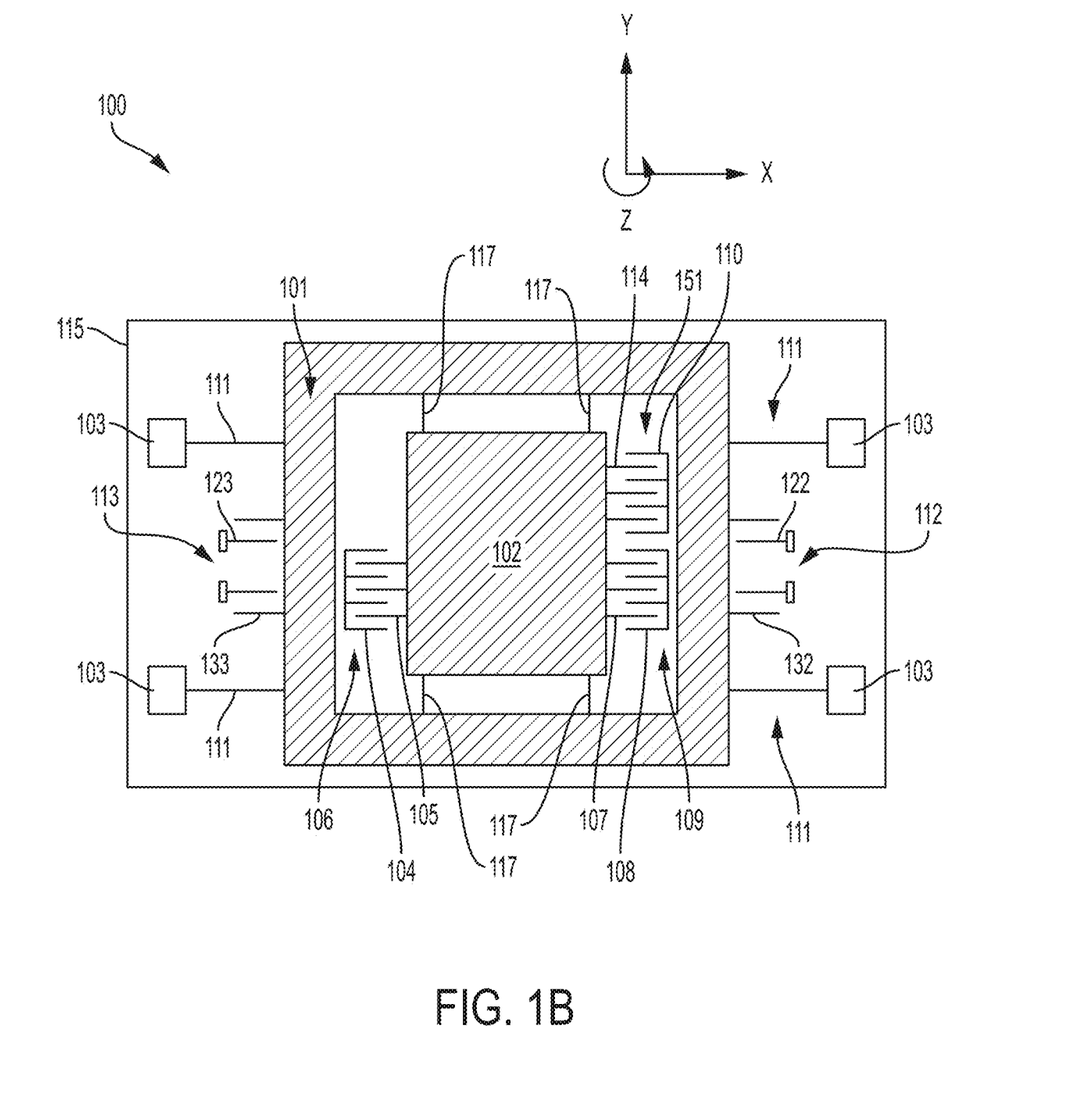
FIG. 1B is a schematic of an illustrative MEMS gyroscope that may serve as the MEMS gyroscope of FIG. 1A, in accordance with some embodiments of the technology described herein.

One example implementation of gyroscope 10 is illustrated in FIG. 1B, in accordance with some embodiments. In this example, gyroscope 100 is configured to resonate in a direction parallel to the x-axis and to detect Coriolis forces in a direction parallel to the y-axis. It should be appreciated, however, that gyroscopes of the types described herein are not limited to any specific direction of resonance or detection.

MEMS gyroscope 100 includes proof masses 101 and 102, anchors 103, fingers 105, 107, 114, 132 and 133, and stationary electrodes 104, 108, 110, 122 and 123. Proof masses 101 and 102 may be suspended above substrate 115, which may be made of silicon in some embodiments. Substrate 115, proof masses 101 and 102, anchors 103, fingers 105, 107, 114, 132 and 133, and stationary electrodes 104, 108, 110, 122 and 123 may be fabricated using MEMS techniques. For example, proof masses 101 and 102 may be formed by depositing a layer of material on top of a sacrificial layer. Subsequently, the sacrificial layer may be etched, thus leaving the proof masses suspended above the substrate 115. In one example, proof masses 101 and 102 are made of polysilicon (doped or undoped). Proof masses 102 sand 101 may serve as resonator 12 and sensor 14 (see FIG. 1A), respectively.

Proof mass 101 is connected to the substrate via anchors 103, which may extend in a direction parallel to the z-axis. In addition, proof mass 101 is connected to the anchors via flexures 111. Flexures 111 may allow for motion of proof mass 101 in a direction parallel to the y-axis.

As illustrated, proof mass 102 is enclosed within proof mass 101 in the xy-plane. However, not all embodiments are limited to this arrangement. Proof mass 101 and 102 are elastically coupled to one another via flexures 117. Flexures 117 allow for motion of proof mass 102 in a direction parallel to the x-axis.

Operation of the MEMS gyroscope 100 is based on the Coriolis effect. In the example of FIG. 1B, angular motion of the MEMS gyroscope about the z-axis may be detected by detecting acceleration of the proof mass 101 in the y-axis direction when proof mass 102 is driven to oscillate in the x-axis direction. As such, the x-axis is referred to herein as the "resonator axis" and the y-axis is referred to herein as the "Coriolis axis." However, MEMS gyroscopes of the types described herein are not limited to detection of angular motion about the z-axis as shown in the figure, but can be used to detect motion about any suitable axis. Additionally, some MEMS gyroscopes may even be configured as multi-axis gyroscopes, whereby angular motion about two or three axes may be detected using a single device (e.g., a single pair of elastically coupled proof masses).

Oscillation of proof mass in the x-axis direction may be initiated using drivers 106 and 109 (though any other suitable number of drivers may be used). Driver 106 includes stationary electrodes 104 and fingers 105. Stationary electrodes 104 may be attached to substrate 115 via anchors extending along the z-axis. Fingers 105 are connected to, and extend away from, proof mass 102. Fingers 105 and stationary electrodes 104 are arranged in an alternating configuration and form a plurality of capacitors. Similarly, driver 109 includes stationary electrodes 108 and fingers 107. Motion of the proof mass 102 along the x-axis may be instituted through the application of a signal at the capacitors formed between the stationary electrodes and the fingers. Accordingly, when a signal is applied at the capacitors, attractive electrostatic forces arise which cause displacement of the proof mass from its initial position in the x-axis direction. Application of periodic signals (e.g., sinusoidal signals) may cause the proof mass to oscillate periodically. Drivers 106 and 109 may be driven with signals that are out-of-phase (e.g., by approximately) 180° relative to one another.

As described further below, in some embodiments, it is be desirable to monitor the motion of proof mass 102 during operation. Motion of the proof mass 102 may be monitored using motion detector 151. Motion detector 151 includes stationary electrodes 110 and fingers 114 forming a plurality of capacitors. For the sake of simplicity, only one motion detector 151 is shown in the exemplary embodiment of FIG. 1B, although alternative embodiments may have additional motion detectors. When the proof mass moves in response to a drive signal, the extent to which finger 114 and stationary electrode 110 overlap with one another is varied (due to a longitudinal motion of the finger), thus varying the capacitance of the capacitor. As such, a signal may be generated in the motion detector 151 in response to motion of proof mass 102. For example, motion of the proof mass 102 may give rise to an electric current in the capacitors of motion detector 151, and the amplitude of the electric current is proportional to the instantaneous velocity of the proof mass.

When MEMS gyroscope 100 is subjected to angular motion about the z-axis (assuming that proof mass 102 is oscillating when the angular motion occurs), a Coriolis force is generated which may result in an acceleration in the y-axis direction. The velocity at which the angular motion occurs may be inferred from the amplitude of the Coriolis force-induced acceleration. In some embodiments, proof mass 101 may be used to sense these accelerations. Specifically, in the embodiment of FIG. 1B, motion detector 112 (which includes stationary electrodes 122 and fingers 132) and motion detector 113 (which includes stationary electrodes 123 and fingers 133) may be used to sense motion of the proof mass 101 in the y-axis direction. Accordingly, motion of the proof mass 101 in the y-axis direction may generate an electric current in the capacitors of the motion detectors 112 and 113. The magnitude of the acceleration experienced by the proof mass 101, and as a result the angular velocity of MEMS gyroscope 100, may be inferred from the electric current generated by the motion detectors 112 and 113.

Control of the operations of MEMS gyroscope 10 is performed using control circuitry, which may be integrated in the same substrate as the gyroscope or in a separate substrate. The control circuitry may include circuits for causing resonator 12 to oscillate, circuits for monitoring motion of resonator 12, circuits for sensing motion of sensor 14, and/or circuits for stabilizing the motion of sensor 14.

III. Sensing Angular Motion in the Presence of Low-Frequency Noise

Figure 2:
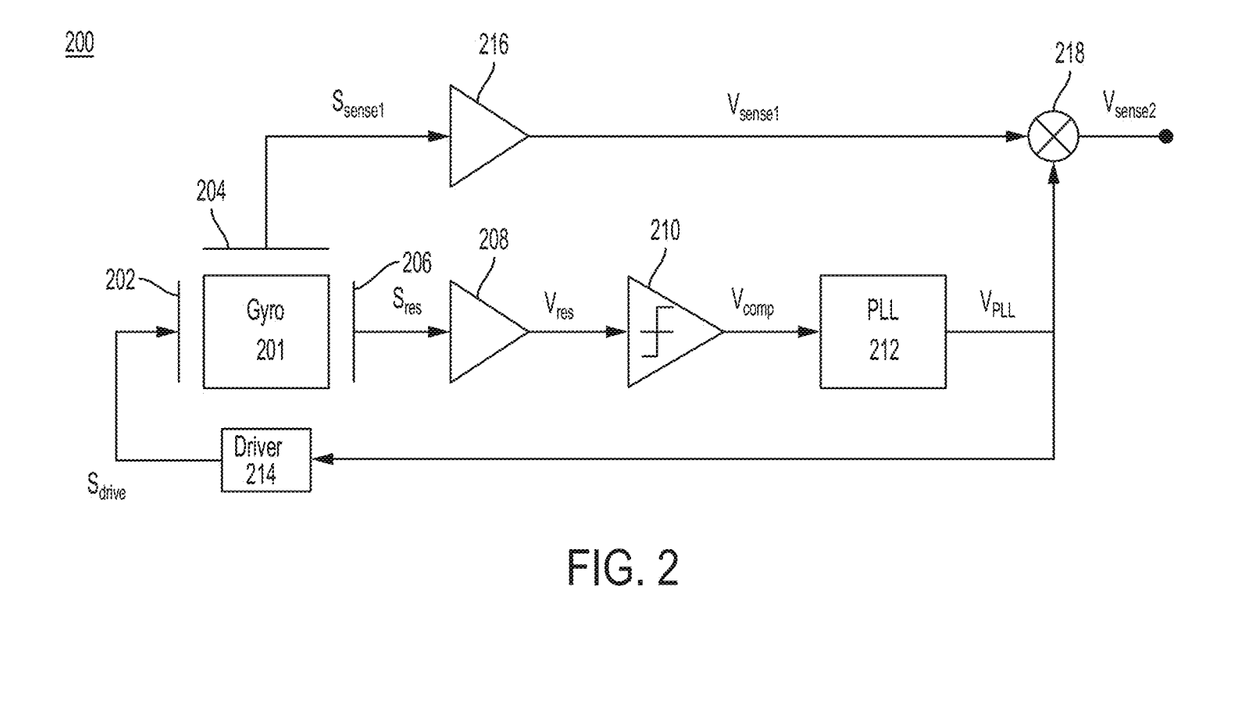
FIG. 2 is a block diagram illustrating a system for sensing angular motion using a MEMS gyroscope, in accordance with some embodiments of the technology described herein.

One representative system for sensing angular motion using a MEMS gyroscope in the presence of low-frequency noise is illustrated in FIG. 2, in accordance with some embodiments. System 200 includes MEMS gyroscope ("gyro") 201, which may serve as MEMS gyroscope 10 (an example of which is illustrated in FIG. 1B), amplifiers 208 and 216, comparator 210, phase locked loop ("PLL") 212, driver 214 and mixer 218.

Gyro 201 includes terminals 202, 204 and 206. Terminal 202, also referred to as the "resonator path input terminal," is coupled to driver 214. Signal $S_{drive}$ may be configured to cause, when received at terminal 202, resonance of the resonator of gyro 201. $S_{drive}$ may be a voltage signal or a current signal. Terminal 202 may be an electrode arranged for driving the gyro's resonator, examples of which include a stationary electrode 104 and a finger 105 (see FIG. 1B). Driver 214 may include circuitry for causing gyro 201's resonator to resonate. For example, driver 214 may include an amplifier and/or circuitry for driving gyro 201's resonator at its resonant frequency. In some embodiments, signal $V_{PLL}$, provided by PLL 212, may provide an indication regarding the resonant frequency of gyro 201's resonator. In some such embodiments, driver 214 may drive gyro 201's resonator at the resonant frequency based on the information received via $V_{PLL}$.

Terminal 204, also referred to as the "sense path output terminal," is coupled to amplifier 216. Terminal 204 may output a signal that is representative of the angular velocity sensed by gyro's 201 sensor. Terminal 204 may be an electrode arranged for providing a signal indicative of motion of gyro 201 in response to Coriolis forces, examples of which being a stationary electrode 122 and a finger 132 (see FIG. 1B). In some embodiments, motion of gyro 201 in response to a Coriolis force may cause a variation in the capacitance of a sense capacitor (e.g., motion detector 112). The signal representing a variation in the capacitance of a sense capacitor due to a Coriolis force is indicated in FIG. 2 as $S_{sense1}$. In some such embodiments, amplifier 216 is configured to generate, based on $S_{sense1}$, a voltage $V_{sense1}$ that is representative of the Coriolis force experienced by gyro 201. For example, amplifier 216 may include a transimpedance amplifier and/or a capacitance-to-voltage converter.

Terminal 206, referred to herein as the "resonator path output terminal," is coupled to amplifier 208. In some embodiments, the signal at terminal 206 may be used to monitor motion of gyro 201's resonator, for example to determine whether the resonator is oscillating at its resonant frequency or not. Terminal 206 may be an electrode arranged for providing a signal indicative of the motion of gyro 201's resonator, examples of which being a stationary electrode 110 and a finger 114 (see FIG. 1B). In some embodiments, motion of gyro 201's resonator in response to signal $S_{drive}$ may cause a variation in the capacitance of a capacitor (e.g., motion detector 151). The signal representing the variation in the capacitance of such capacitor is indicated in FIG. 2 as $S_{res}$. In some such embodiments, amplifier 208 is configured to generate, based on $S_{res}$, a voltage $V_{res}$ that is representative of the motion of gyro 201's resonator. For example, amplifier 208 may include a trans-impedance amplifier and/or a capacitance-to-voltage converter.

Comparator 210 may be configured to convert the signal output by amplifier 208 into a square wave. In some embodiments, comparator 210 may receive $V_{res}$ as a first input, a reference voltage as a second input, and may output a value depending on whether $V_{res}$ is greater or less than the reference voltage. For example, if $V_{res}$ is greater than the reference voltage, $V_{comp}$ may be equal to a voltage representing a logic 1 and if $V_{res}$ is less than the reference voltage, $V_{comp}$ may be equal to a voltage representing a logic 0. The opposite logic is also possible. In one example, $V_{res}$ may include a portion of a sinusoidal signal with no offset (with a zero average value), and the reference voltage may be set to zero. In this example, $V_{comp}$ may be a square wave with a 50% duty cycle.

The output of comparator 210, $V_{comp}$, may be provided as input to PLL 212, which in response may output signal $V_{PLL}$. PLL 212 may be configured to lock the frequency of $V_{PLL}$ to the resonant frequency of gyro 201's resonator. $V_{PLL}$, also referred to as the "demodulating signal," may be used to demodulate signal $V_{sense1}$ to baseband. For example, $V_{PLL}$ may be mixed with (e.g., multiplied to) sense signal $V_{sense1}$ using mixer 218. The signal resulting from the mixing—$V_{sense2}$—may provide an indication as to the angular motion experienced by gyroscope 201. In some embodiments, signal $V_{PLL}$ may be provided as input to driver 214 to ensure that gyro 201's resonator is driven at its resonant frequency.

In some circumstances, system 200 may experience low-frequency noise. Such noise may originate, among other components, at amplifier 208 and comparator 210 and may be due, in part or in full, to impurities in the conductive channel of a transistor or generation and recombination noise of a transistor due to base current, among other possible effects.

As described above, in some embodiments, the signal $V_{comp}$ may be a square wave with a 50% duty cycle when $V_{res}$ is a sinusoidal with a zero offset. However, in some circumstances, low-frequency noise may be additively combined to $V_{res}$. As a result, $V_{res}$ may exhibit a non-zero offset (a non-zero average value).

Figure 3A:
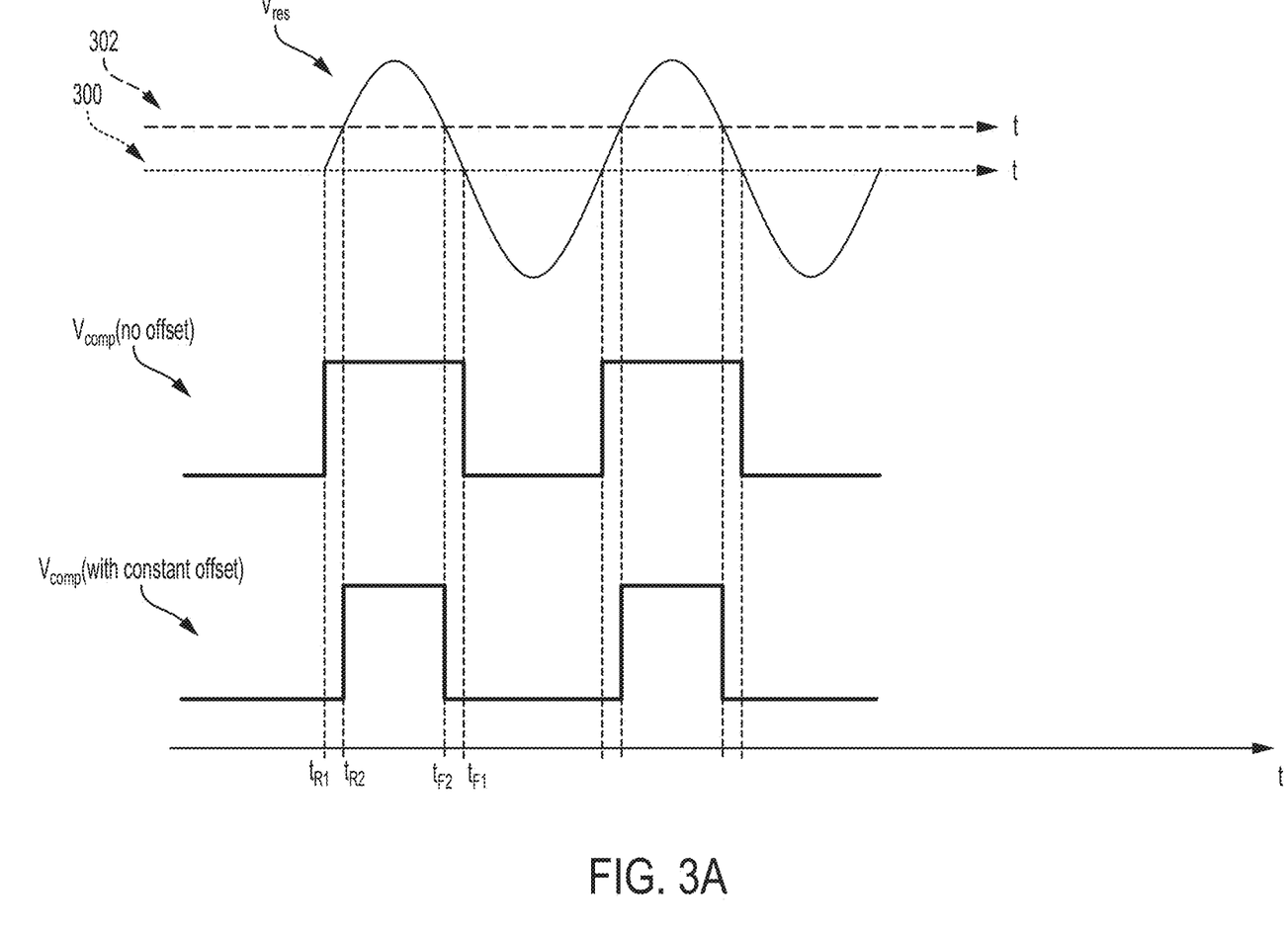
FIG. 3A is a plot illustrating a square wave signal in the absence of noise and a square wave signal in the presence of direct current (DC) noise, in accordance with some embodiments of the technology described herein.

This scenario is illustrated in FIG. 3A, in accordance with some embodiments. The top portion of FIG. 3A illustrates $V_{res}$, which includes a portion of a sinusoidal signal. Two axes are illustrated, 300 and 302. Axis 300 represents the time axis when $V_{res}$ includes no offset. In this case, $V_{res}$ exhibits a substantially zero average. Axis 302 represents the time axis when $V_{res}$ includes a constant offset, which may be due to the presence of direct current (DC) noise (a constant additive noise). In this case, the average of $V_{res}$ is vertically offset relative to the time axis. In other words, $V_{res}$ exhibits a non-zero average.

The plot labeled "$V_{comp}$ (no offset)" illustrates $V_{comp}$ in the absence of DC noise, assuming that the reference voltage of comparator 210 is set to zero. As illustrated, $V_{comp}$ exhibits a transition (rising edge or falling edge) in response to $V_{res}$ crossing axis 300. For example, at $t=t_{R1}$, $V_{res}$ rises above axis 300 and as a result $V_{comp}$ exhibits a rising edge.

At $t=t_{F1}$, $V_{res}$ falls below axis 300 and as a result $V_{comp}$ exhibits a falling edge. In this case, $V_{comp}$ has a 50% duty cycle.

The plot labeled "$V_{comp}$ (with constant offset)" illustrates $V_{comp}$ in the presence of DC noise, assuming that the reference voltage of comparator 210 is set to zero. As illustrated, $V_{comp}$ exhibits a transition (edge or falling edge) in response to $V_{res}$ crossing axis 302. For example, at $t=t_{R2}$, $V_{res}$ rises above axis 302 and as a result $V_{comp}$ exhibits a rising edge. At $t=t_{F2}$, $V_{res}$ falls below axis 302 and as a result $V_{comp}$ exhibits a falling edge. In this case, $V_{comp}$ has duty cycle different (and, in this example, less) than 50%.

Figure 3B:
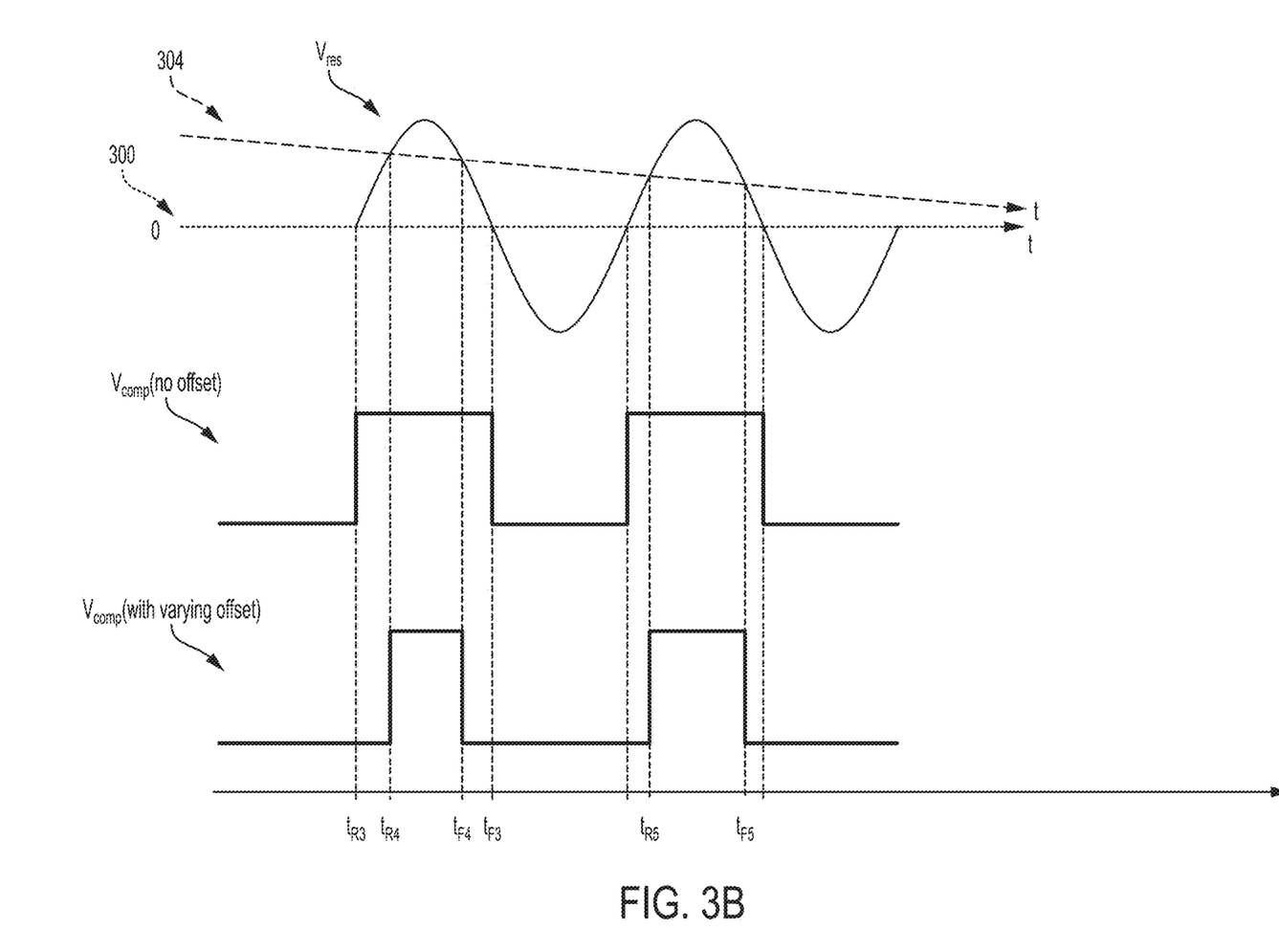
FIG. 3B is a plot illustrating a square wave signal in the absence of noise and a square wave signal in the presence of low-frequency noise, in accordance with some embodiments of the technology described herein.

In other circumstances, low-frequency noise with a bandwidth greater than zero may be combined additively with $V_{res}$. The low-frequency noise described herein may exhibit a spectral bandwidth of less than 10 KHz, less than 7.5 KHz, less than 5 KHz, less than 2.5 KHz, less than 1 KHz, less than 750 Hz, less than 500 Hz, less than 250 Hz, or less than 100 Hz, among other possible values. FIG. 3B is a plot illustrating $V_{comp}$ in the presence of low-frequency noise with a bandwidth greater than zero, in accordance with some embodiments. As in the case of FIG. 3A, axis 300 represents the time axis when $V_{res}$ includes no offset. In this case, $V_{res}$ exhibits a substantially zero average. Axis 304 represents the time axis in the presence of a low-frequency noise. In this case, the offset of $V_{res}$ is not only different from zero, but it also varies over time. This is because, having a bandwidth that is greater than zero, the noise that is added to $V_{res}$ has time-varying amplitude.

The plot labeled "$V_{comp}$ (no offset)" illustrates $V_{comp}$ in the absence of noise, assuming that the reference voltage of comparator 210 is set to zero. As illustrated, $V_{comp}$ exhibits a rising edge at $t=t_{R3}$ and a falling edge at $t=t_{F3}$. In this case, $V_{comp}$ has a 50% duty cycle.

The plot labeled "$V_{comp}$ (with varying offset)" illustrates $V_{comp}$ in the presence of low-frequency noise with a bandwidth greater than zero, assuming that the reference voltage of comparator 210 is set to zero. First, $V_{res}$ rises above axis 304 at $t=t_{R4}$ and falls below axis 304 at $t=t_{F4}$. As a result, $V_{comp}$ exhibits a rising edge at $t=t_{R4}$ and a falling edge at $t=t_{F4}$. Subsequently, $V_{res}$ rises above axis 304 again at $t=t_{R5}$ and falls below axis 304 again at $t=t_{F5}$. As a result, $V_{comp}$ exhibits a rising edge at $t=t_{R5}$ and a falling edge at $t=t_{F5}$. Because the offset of $V_{res}$ varies over time, the interval $t_{F5}-t_{R5}$ is greater than the interval $t_{F4}-t_{R4}$. The result is that the duty cycle of $V_{comp}$ is different than 50% and varies over time. Absent the systems and techniques described herein, demodulating signal $V_{PLL}$ may also exhibit a varying duty cycle, due to the fact that $V_{comp}$ exhibits a varying duty cycle. If such a demodulating signal were used to demodulate $V_{sense1}$ to baseband, the accuracy with which system 200 senses angular motion would be significantly degraded.

Figure 4:
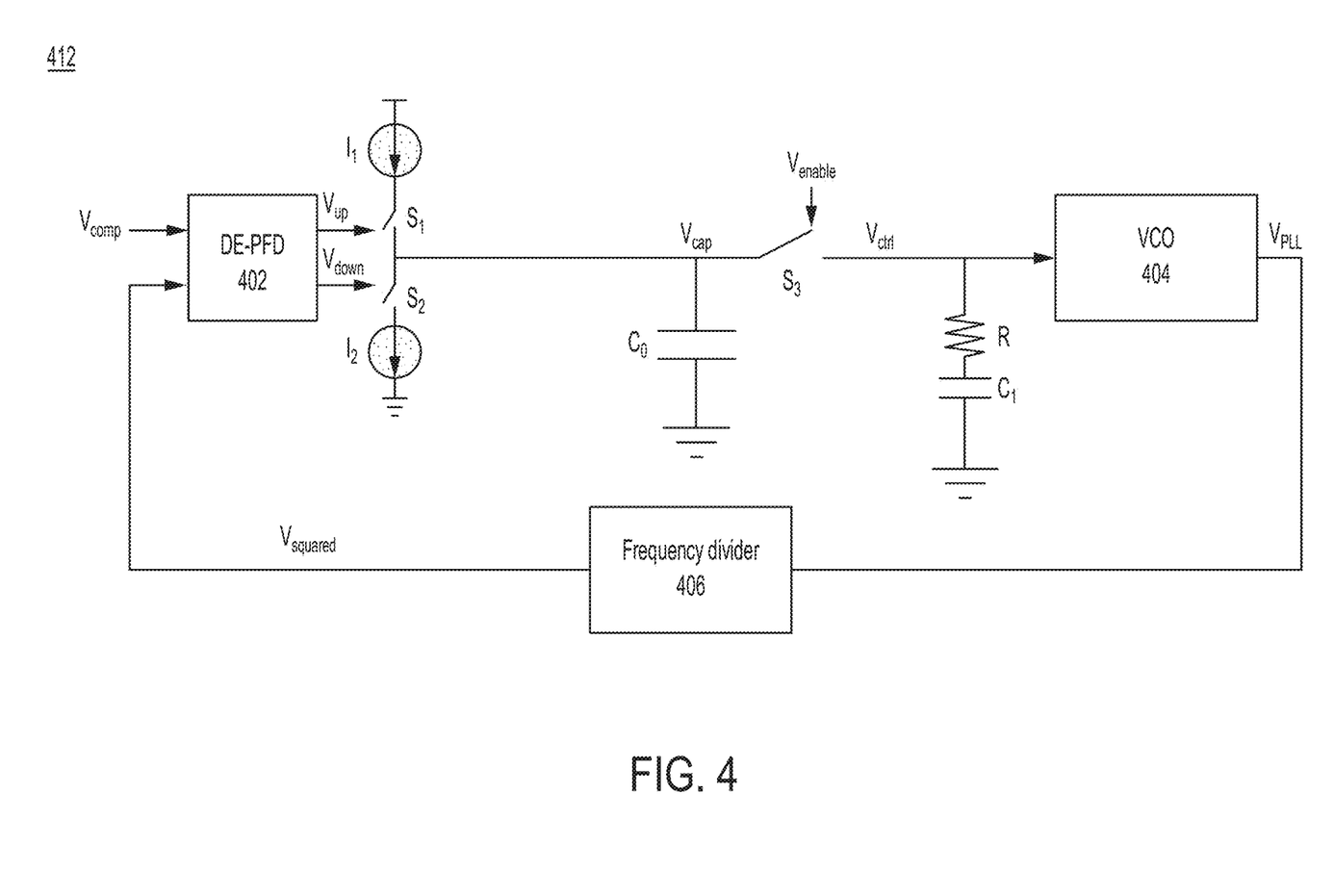
FIG. 4 is a schematic of a phase locked loop (PLL) that may be used with the system of FIG. 2, in accordance with some embodiments of the technology described herein.

To address this problem, in some embodiments, a demodulating signal may be generated to have a duty cycle substantially equal to 50% even in the presence of low-frequency noise. A representative PLL configured to produce such a demodulating signal is illustrated in FIG. 4, in accordance with some embodiments. PLL 412 may serve as PLL 212. PLL 412 includes dual-edge phase frequency detector (DE-PFD) 402, current generators $I_1$ and $I_2$, switches $S_1$, $S_2$ and $S_3$, voltage controlled oscillator (VCO) 404, frequency divider 406, capacitor $C_0$ and $C_1$ and resistor $R_1$. Current generators $I_1$ and $I_2$, switches $S_1$, $S_2$ and capacitor $C_0$ may be collectively arranged to serve as a charge pump, as will be described further below.

Figure 5A:
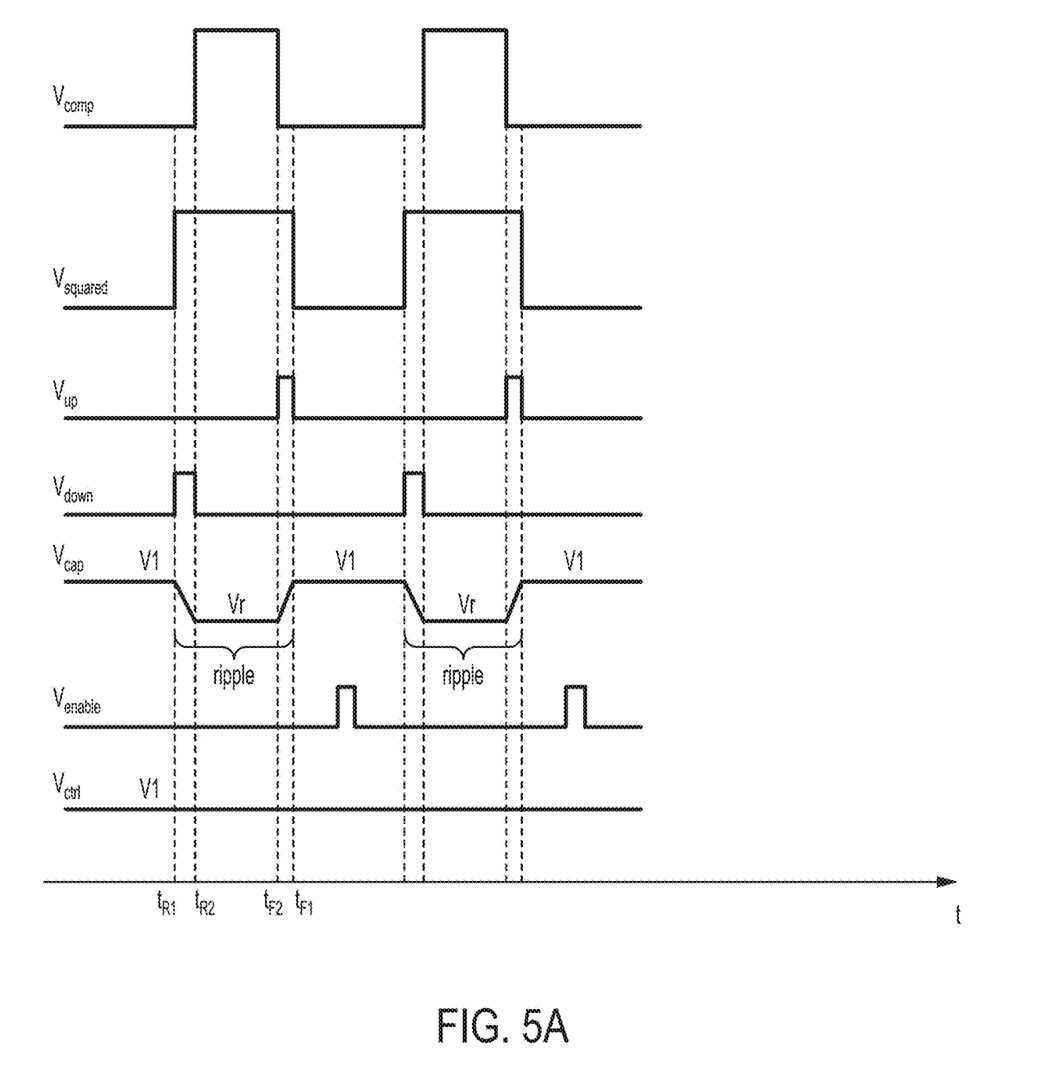
FIG. 5A is a plot illustrating the output of the PLL of FIG. 4 in the presence of DC noise, in accordance with some embodiments of the technology described herein.

FIG. 5A is a plot illustrating an example of how PLL 412 may be configured to operate in the presence of DC noise, in accordance with some embodiments. As in the case described in connection with FIG. 3A, $V_{comp}$ exhibits a duty cycle different from 50%, with a rising edge occurring at $t=t_{R2}$ and a falling edge occurring at $t=t_{F2}$. $V_{squared}$ represents the signal output by frequency divider 406. In some embodiments, $V_{squared}$ may have a frequency that is a fraction of the frequency of $V_{PLL}$. The fraction may be determined by the dividing factor of frequency divider 406. In some embodiments, VCO 404 may be arranged to output signals with a 50% duty cycle. As a result, $V_{squared}$ may also exhibit a 50% duty cycle. As illustrated in FIG. 5A, $V_{squared}$ exhibits a rising at $t=t_{R1}$ and a falling edge at $t=t_{F1}$.

DE-PFD 402 may be configured to receive as inputs $V_{comp}$ and $V_{squared}$, and to compare the times at which these input signals exhibit an edge. The output signals, $V_{up}$ and $V_{down}$, may be generated based on the comparison. For example, DE-PFD 402 may generate $V_{up}$ to have a pulse having a width substantially equal to the interval between the occurrence of a falling edge in $V_{comp}$ and the occurrence of a falling edge in $V_{squared}$. Additionally, DE-PFD 402 may generate $V_{down}$ to have a pulse having a width substantially equal to the interval between the occurrence of a rising edge in $V_{comp}$ and the occurrence of a rising edge in $V_{squared}$. In this way, $V_{up}$ and $V_{down}$ provide a measure of the extent to which $V_{comp}$ deviates from the 50% duty cycle scenario.

$V_{up}$ may be used to enable switch $S_1$ and $V_{down}$ to enable switch $S_2$. For example, when $V_{up}$ exhibits a pulse, switch $S_1$ may be in a conductive state, and when $V_{down}$ exhibits a pulse, switch $S_2$ may be in a conductive state. When switch $S_1$ is in a conductive state (e.g., closed) and switch $S_2$ in a non-conductive state (e.g., open), current $I_1$ charges capacitor $C_0$, thus increasing voltage $V_{cap}$. When switch $S_1$ is in a non-conductive state and switch $S_2$ in a conductive state, current $I_2$ discharges capacitor $C_0$, thus decreasing voltage $V_{cap}$. As shown in FIG. 5A, $V_{cap}$ decreases from $V_1$ to $V_r$ in response to the $V_{down}$-pulse and increases from $V_r$ to $V_1$ in response to the $V_{up}$-pulse.

The inventors have appreciated that, if $V_{cap}$ was provided as input to VCO 404 to control the frequency of $V_{PLL}$, $V_{PLL}$ would exhibit an undesired frequency shift due the presence of a ripple of amplitude $V_r$ between $t=t_{R1}$ and $t=t_{F1}$. Such a frequency shift in $V_{PLL}$ may distort the demodulation of $V_{sense1}$, thus causing sensing errors. To address this problem, in some embodiments, the ripples arising in $V_{cap}$ may be blocked from VCO 404. Switch $S_3$ may be used to block the ripples, in some embodiments. For example, switch $S_3$ may be configured to be in a non-conductive state when $V_{cap}$ exhibits a ripple, and in a conductive state during an interval outside the ripples. The signal controlling the state of switch $S_3$, $V_{enable}$, may be timed and arranged to prevent the ripples from reaching VCO 404. $V_{enable}$ may be generated by control circuitry (not illustrated in FIG. 4) coupled to switch $S_3$. An example of $V_{enable}$ is shown in FIG. 5A. In this case, $V_{enable}$ exhibits a pulse when $V_{cap}=V_1$. As a result, voltage $V_1$ is transferred to the input of VCO 404 (in other words, $V_{ctrl}=V_1$). When switch $S_3$ is toggled to its non-conductive state, voltage $V_1$ is maintained at the input of VCO 404 due to the presence of capacitor $C_1$. In other words, $V_{ctrl}$ remains substantially constant and equal to $V_1$. Therefore, the frequency of $V_{PLL}$ is not adjusted in the presence of DC noise.

Figure 5B:
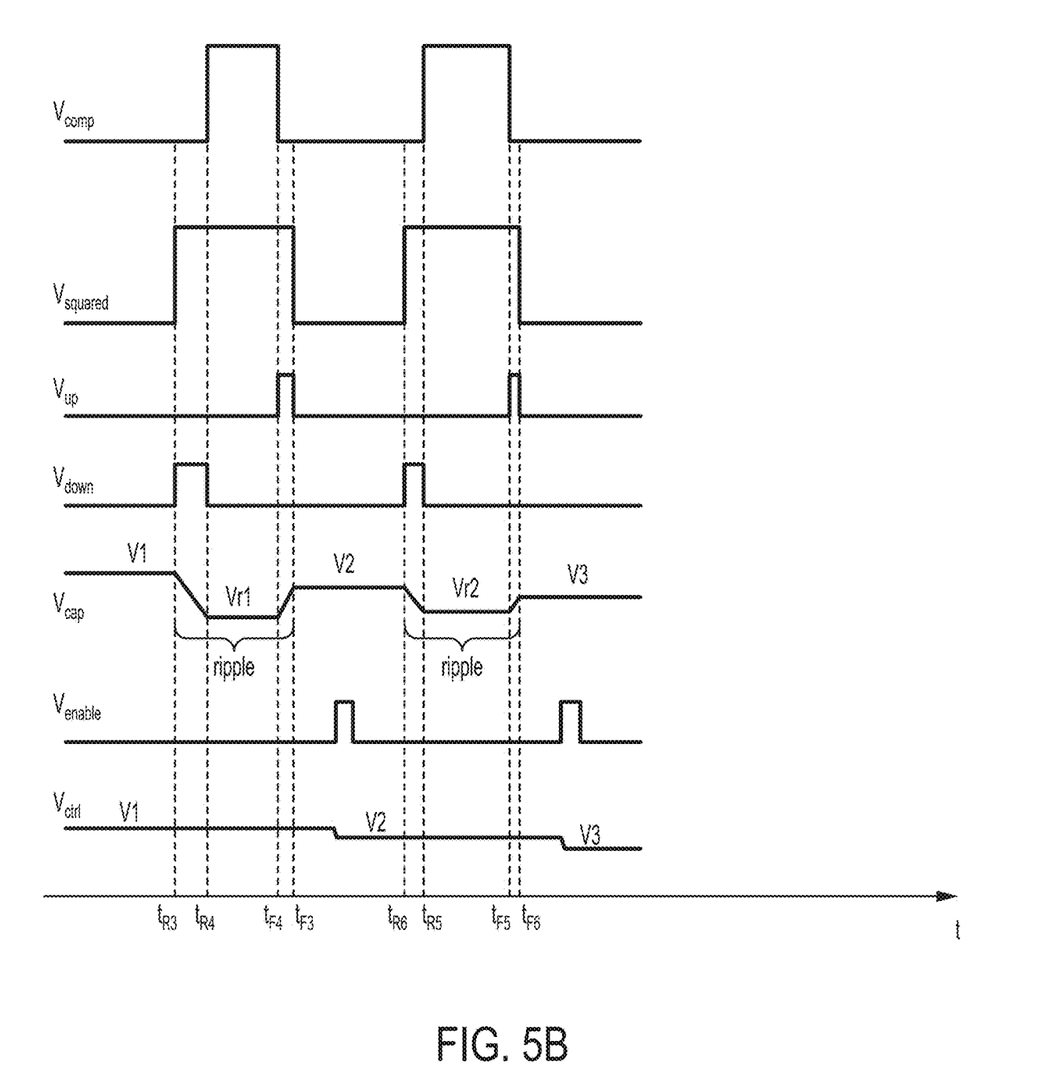
FIG. 5B is a plot illustrating the output of the PLL of FIG. 4 in the presence of low-frequency noise, in accordance with some embodiments of the technology described herein.

However, if low-frequency noise with a bandwidth greater than zero is present, it may be desirable to adjust the frequency of $V_{PLL}$ to counteract the effect of duty cycle jitter. FIG. 5B is a plot illustrating an example of how PLL 412 may be operated in the presence of low-frequency noise, in accordance with some embodiments. $V_{comp}$ exhibits a duty cycle different than 50%, with a rising edge occurring at $t=t_{R4}$ and a falling edge occurring at $t=t_{F4}$, while $V_{squared}$ has a 50% duty cycle, with a rising edge occurring at $t=t_{R3}$ and a falling edge occurring at $t=t_{F3}$.

Because the amplitude of the noise varies over time (see FIG. 3B) $V_{comp}$ exhibits duty cycle jitter. For example, the interval ($t_{R4}-t_{R3}$) between the occurrence of the first rising edge in $V_{squared}$ and the occurrence of the first rising edge in $V_{comp}$, is different than the interval ($t_{F3}-t_{F4}$) between the occurrence of the first falling edge in $V_{squared}$ and the occurrence of the first falling edge in $V_{comp}$. In addition, the interval ($t_{R4}-t_{R3}$) between the occurrence of the first rising edge in $V_{squared}$ and the occurrence of the first rising edge in $V_{comp}$, is different than the interval ($t_{R5}-t_{R6}$) between the occurrence of the second rising edge in $V_{squared}$ and the occurrence of the second rising edge in $V_{comp}$. Furthermore, the interval ($t_{R5}-t_{R5}$) between the occurrence of the second rising edge in $V_{squared}$ and the occurrence of the second rising edge in $V_{comp}$ is different than the interval ($t_{F6}-t_{F5}$) between the occurrence of the second falling edge in $V_{squared}$ and the occurrence of the second falling edge in $V_{comp}$. As a result, the width of the first $V_{up}$-pulse is different than the width of the second $V_{up}$-pulse, which is different than the width of the first $V_{down}$-pulse, which is different than the width of the second $V_{down}$-pulse.

When $V_{up}$ exhibits a pulse, switch $S_1$ may be in a conductive state, thus causing current $I_1$ to charge capacitor $C_0$. When $V_{down}$ exhibits a pulse, switch $S_2$ may be in a conductive state, thus causing current $I_2$ to discharge capacitor $C_0$. In response to the first $V_{down}$-pulse, voltage $V_{cap}$ decreases from $V_1$ to $V_{r1}$. In response to the first $V_{up}$-pulse, voltage $V_{cap}$ increases from $V_{r1}$ to $V_2$. Because the width of the first $V_{down}$-pulse is greater than the width of the first $V_{up}$-pulse, the extent to which $V_{cap}$ increases from $V_{r1}$ to $V_2$ is less than the extent to which $V_{cap}$ decreases from $V_1$ to $V_{r1}$. As a result, $V_2$ is less than $V_1$. Furthermore, because the width of the second $V_{down}$-pulse is greater than the width of the second $V_{up}$-pulse, the extent to which $V_{cap}$ increases from $V_{r2}$ to $V_3$ is less than the extent to which $V_{cap}$ decreases from $V_2$ to $V_{r2}$. As a result, $V_3$ is less than $V_2$.

Thus, duty cycle jitter caused by low-frequency noise is counteracted by varying the frequency output by VCO 404, which is performed by varying the input of VCO 404 from $V_1$ to $V_2$, and from $V_2$ to $V_3$.

The presence of the ripples in $V_{cap}$, however, may shift the frequency of $V_{PLL}$ in an undesired manner, which in turn may distort the demodulation of $V_{sense1}$, thus causing sensing errors. In this example, $V_{cap}$ exhibits a ripple of amplitude $V_{r1}$ between $t_{R3}$ and $t_{F3}$ and a ripple of amplitude $V_{r2}$ between $t_{R6}$ and $t_{F6}$. To obviate this problem, in some embodiments, the ripples may be blocked. In some embodiments, the ripples may be blocked by causing switch $S_3$ to remain in a non-conductive state when a ripple is present. $V_{enable}$ may be used to control the state of switch $S_3$.

An example of $V_{enable}$ is shown in FIG. 5B. In this case, $V_{enable}$ exhibits a pulse when $V_{cap}=V_2$. As a result, $V_{ctrl}$ varies from $V_1$ to $V_2$, without exhibiting a ripple. When switch $S_3$ is toggled to its non-conductive state, voltage $V_2$ is maintained at the input of VCO 404 due to the presence of capacitor $C_1$. $V_{enable}$ exhibits another pulse when $V_{cap}=V_3$. As a result, $V_{ctrl}$ varies from $V_2$ to $V_3$, without exhibiting a ripple. When switch $S_3$ is toggled back to its non-conductive state, voltage $V_3$ is maintained at the input of VCO 404 due to the presence of capacitor $C_1$.

Therefore, the voltage provided to VCO 404 varies from $V_1$ to $V_2$ and then to $V_3$, causing the frequency of $V_{PLL}$ to vary from $f_1$ to $f_2$ and then to $f_3$. Varying the frequency in this manner may ensure than the duty cycle of $V_{PLL}$ remain approximately 50%. It should be appreciated that the techniques described in connection with FIG. 5B may be particularly effective to counteract low frequency noise (e.g., with a spectral bandwidth of less than 10 KHz, less than 7.5 KHz, less than 5 KHz, less than 2.5 KHz, less than 1 KHz, less than 750 Hz, less than 500 Hz, less than 250 Hz, or less than 100 Hz, among other possible values), but may be less effective to counteract noise with higher frequency content.

Figure 6:
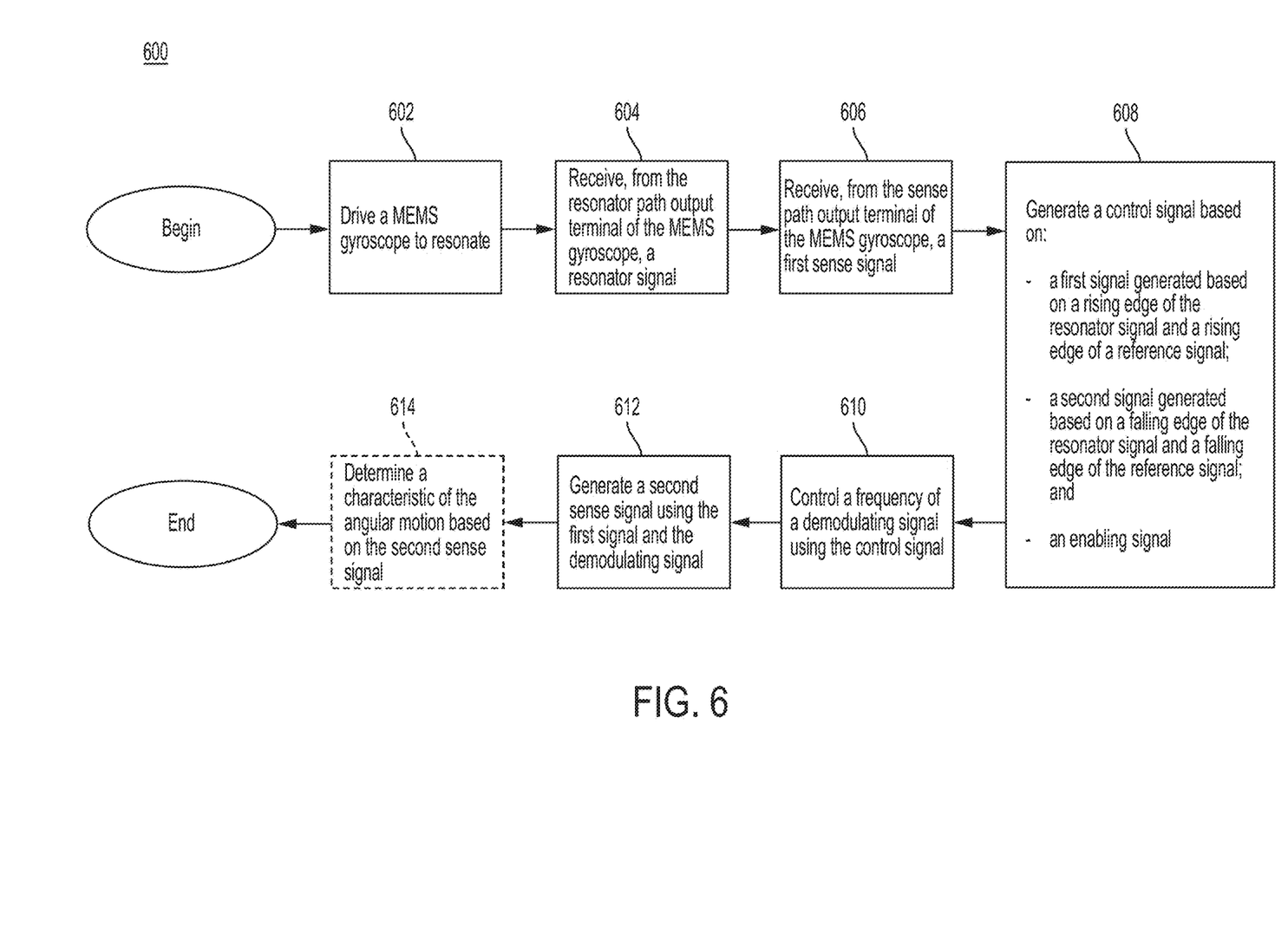
FIG. 6 is a flowchart of an illustrating process for sensing angular motion using a MEMS gyroscope, in accordance with some embodiments of the technology described herein.

An illustrative process 600 for sensing angular motion using a MEMS gyroscope is illustrated in FIG. 6, in accordance with some embodiments of the technology described herein. In some embodiments, process 600 may be performed by illustrative system 200, described in connection with FIG. 2. Process 600 begins at act 602, in which a MEMS gyroscope is driven to resonate. For example, gyro 201 may be driven to resonate using $S_{drive}$.

At act 604, a resonator signal generated in response to resonance of the MEMS gyroscope may be received from the resonator path output terminal of the MEMS gyroscope. For example, $V_{comp}$ may be received, in response to resonance of gyro 201, from terminal 206, and through amplifier 208 and comparator 210.

At act 606, a first sense signal generated in response to a Coriolis force may be received from the sense path output terminal of the MEMS gyroscope. For example, $V_{sense1}$ may be received from terminal 204, and through amplifier 216. The Coriolis force may arise in response to angular motion in combination with the resonance of the MEMS gyroscope.

At act 608, a control signal may be generated based on: 1) a first signal generated based on a rising edge of the resonator signal and a rising edge of a reference signal; 2) a second signal generated based on a falling edge of the resonator signal and a falling edge of the reference signal; and 3) an enabling signal. For example, signal $V_{ctrl}$ may be generated based on: 1) $V_{down}$; 2) $V_{up}$; and 3) $V_{enable}$. The enabling signal may be configured to prevent the formation of ripples in the control signal. In some embodiments, the enabling signal is configured to control a state of a switch, such as switch $S_3$ of FIG. 4. For example, the enabling signal may be configured to maintain the switch in a non-conductive state when a ripple is received at the switch.

At act 610, the frequency of a demodulating signal may be controlled using the control signal. For example, the frequency of $V_{PLL}$ may be controlled using $V_{ctrl}$. In some embodiments, the frequency of the demodulating signal may be varied from $f_1$ to $f_2$ in response to the control signal varying from $V_1$ to $V_2$.

At act 612, a second sense signal may be generated using the first sense signal and the demodulating. For example, signal $V_{sense2}$ may be generated using signals $V_{sense1}$ and $V_{PLL}$. In some embodiments, the first sense signal and the demodulating signal may be mixed so that the second sense signal is a demodulated version of the first sense signal.

Optionally, at act 614, a characteristic (e.g., a magnitude and/or a direction of the angular velocity) of the angular motion experienced by the MEMS gyroscope may be determined based on the second sense signal.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

What is claimed is:

1. A method for sensing angular motion using a microelectromechanical system (MEMS) gyroscope having a sense path output terminal and a resonator path output terminal, the method comprising:
   receiving, from the resonator path output terminal, a resonator signal generated in response to resonance of the MEMS gyroscope;
   generating a control signal at least in part based on:
      a first signal generated based on a time difference between a rising edge of the resonator signal and a rising edge of a reference signal; and
      a second signal generated based on a time difference between a falling edge of the resonator signal and a falling edge of the reference signal;
   controlling a frequency of a demodulating signal using the control signal;
   receiving, from the sense path output terminal, a first sense signal generated in response to a Coriolis force; and
   generating a second sense signal using the first sense signal and the demodulating signal.

2. The method of claim 1, wherein the control signal is further generated at least in part based on an enabling signal, and wherein generating the control signal comprises controlling a state of a switch using the enabling signal.

3. The method of claim 2, wherein controlling the state of the switch comprises maintaining the switch in a non-conductive state when a ripple is received at the switch.

4. The method of claim 1, wherein generating a second sense signal using the first sense signal and the demodulating signal comprises mixing the first sense signal with the demodulating signal.

5. The method of claim 1, further comprising determining a characteristic of the angular motion based on the second sense signal.

6. The method of claim 1, further comprising generating the reference signal by providing the demodulating signal as input to a frequency divider.

7. The method of claim 1, wherein controlling the frequency of the demodulating signal results in setting a duty cycle of the demodulating signal to be approximately 50%.

8. The method of claim 1, wherein a relative duration of the first and second signals is indicative of the duty cycle of the resonator signal.

9. A system for sensing angular motion, the system comprising:
   circuitry configured to:
      receive, from a resonator path output terminal of a microelectromechanical system (MEMS) gyroscope, a resonator signal generated in response to resonance of the MEMS gyroscope;
      generate a control signal at least in part based on:
         a first signal generated based on a time difference between a rising edge of the resonator signal and a rising edge of a reference signal; and
         a second signal generated based on a time difference between a falling edge of the resonator signal and a falling edge of the reference signal;
      control a frequency of a demodulating signal using the control signal;
      receive, from a sense path output terminal of the MEMS gyroscope, a first sense signal generated in response to a Coriolis force; and
      generate a second sense signal using the first sense signal and the demodulating signal.

10. The system of claim 9, wherein the control signal is further generated at least in part based on an enabling signal, wherein the circuitry is configured to control a state of a switch using the enabling signal.

11. The system of claim 10, wherein the circuitry is configured to control the state of the switch to maintain the switch in a non-conductive state when a ripple is received at the switch.

12. The system of claim 9, wherein the circuitry is configured to generate a second sense signal using the first sense signal and the demodulating signal at least in part by mixing the first sense signal with the demodulating signal.

13. The system of claim 9, wherein the circuitry is further configured to determine a characteristic of the angular motion based on the second sense signal.

14. The system of claim 9, wherein the circuitry is configured to obtain the reference signal by providing the demodulating signal as input to a frequency divider.

15. The system of claim 9, wherein the circuitry controlling a frequency of a demodulating signal results in setting a duty cycle of the demodulating signal to be approximately 50%.

16. The system of claim 9, further comprising the MEMS gyroscope.

17. The system of claim 9, wherein a relative duration of the first and second signals is indicative of the duty cycle of the resonator signal.

18. A system for sensing angular motion, the system comprising:
 circuitry configured to:
  receive, from a resonator path output terminal of a microelectromechanical system (MEMS) gyroscope, a resonator signal generated in response to resonance of the MEMS gyroscope;
  control a frequency of a demodulating signal using a control signal generated at least in part based on:
   a first signal generated based on a time difference between a rising edge of the resonator signal and a rising edge of a reference signal; and
   a second signal generated based on a time difference between a falling edge of the resonator signal and a falling edge of the reference signal;
  receive, from a sense path output terminal of the MEMS gyroscope, a first sense signal generated in response to a Coriolis force; and
  generate a second sense signal using the first sense signal and the demodulating signal.

19. The system of claim 18, wherein the control signal is further generated at least in part based on an enabling signal, and wherein the circuitry is configured to control a state of a switch using the enabling signal.

20. The system of claim 19, wherein the circuitry is configured to control the state of the switch to maintain the switch in a non-conductive state when a ripple is received at the switch.

* * * * *